(12) United States Patent
Matsuura

(10) Patent No.: US 10,047,788 B2
(45) Date of Patent: Aug. 14, 2018

(54) BALL JOINT AND METHOD OF MANUFACTURING THE SAME

(71) Applicant: KABUSHIKI KAISHA SOMIC ISHIKAWA, Tokyo (JP)

(72) Inventor: Daisuke Matsuura, Hamamatsu (JP)

(73) Assignee: KABUSHIKI KAISHA SOMIC ISHIKAWA, Tokyo (JP)

(*) Notice: Subject to any disclaimer, the term of this patent is extended or adjusted under 35 U.S.C. 154(b) by 196 days.

(21) Appl. No.: 14/899,293

(22) PCT Filed: May 29, 2014

(86) PCT No.: PCT/JP2014/064226
§ 371 (c)(1),
(2) Date: Dec. 17, 2015

(87) PCT Pub. No.: WO2015/019690
PCT Pub. Date: Feb. 12, 2015

(65) Prior Publication Data
US 2016/0131182 A1 May 12, 2016

(30) Foreign Application Priority Data

Aug. 6, 2013 (JP) ................. 2013-163466

(51) Int. Cl.
*F16C 11/08* (2006.01)
*F16C 11/06* (2006.01)
(52) U.S. Cl.
CPC .......... *F16C 11/08* (2013.01); *F16C 11/0638* (2013.01); *F16C 11/0685* (2013.01)
(58) Field of Classification Search
CPC ............. F16C 11/0619; F16C 11/0623; F16C 11/0628; F16C 11/0633; F16C 11/0638;
(Continued)

(56) References Cited

U.S. PATENT DOCUMENTS

| 1,123,796 | A | * | 1/1915 | Porter | ................. F16C 11/0604 |
| | | | | | 403/74 |
| 3,677,585 | A | * | 7/1972 | Scheerer | ............. F16C 11/0638 |
| | | | | | 403/140 |

(Continued)

FOREIGN PATENT DOCUMENTS

| JP | 03-213710 A | 9/1991 |
| JP | 8-159147 A | 6/1996 |

(Continued)

OTHER PUBLICATIONS

International Search Report dated Sep. 2, 2014 issue din corresponding PCT Application No. PCT/JP2014/064226.

(Continued)

*Primary Examiner* — Jonathan P Masinick
(74) *Attorney, Agent, or Firm* — Troutman Sanders LLP

(57) ABSTRACT

A ball sheet is formed in a manner such that an inclined surface is inclined relative to an axis-perpendicular direction (B) at a first inclination angle ($\alpha$). A projecting part projecting at an outer edge portion of an opening part of a sheet body of the ball sheet in the axis-perpendicular direction (B) is supported by a supporting part inclined relative to the axis-perpendicular direction (B). A swaged part is deformed by swaging so as to be inclined relative to the axis-perpendicular direction (B) along a specified third inclination angle ($\gamma$) larger than the first inclination angle ($\alpha$). The projecting part is clamped between the supporting part and the swaged part at a position corresponding to at least a part of the inclined surface that is inclined to a tip side of the projecting part relative to the axis-perpendicular direction (B) along the specified first inclination angle ($\alpha$) toward an outer edge portion on the sheet body side.

4 Claims, 3 Drawing Sheets

(58) Field of Classification Search
CPC .............. F16C 11/0685; B60G 7/005; B60G 2204/416; Y10T 403/32631; Y10T 403/32721; Y10T 403/32729; Y10T 403/32737; Y10T 403/32778
USPC .......................................... 384/206, 207, 208
See application file for complete search history.

(56) References Cited

U.S. PATENT DOCUMENTS

| | | | | |
|---|---|---|---|---|
| 3,711,136 | A | * | 1/1973 | Schmidt .............. F16C 11/0633 403/140 |
| 4,504,166 | A | * | 3/1985 | Morin ...................... B23P 11/00 29/898.046 |
| 4,681,475 | A | * | 7/1987 | Kanegawa ............ F16C 11/069 403/135 |
| 5,078,531 | A | * | 1/1992 | Sakai .................. F16C 11/0623 403/133 |
| 5,601,378 | A | * | 2/1997 | Fukukawa .......... F16C 11/0638 277/635 |
| 8,414,215 | B2 | * | 4/2013 | Langendoen ....... F16C 11/0676 277/635 |
| 2005/0207684 | A1 | | 9/2005 | Lu et al. |
| 2009/0279944 | A1 | | 11/2009 | Schmitz et al. |
| 2013/0121754 | A1 | * | 5/2013 | Kuroda ............... F16C 11/0623 403/122 |

FOREIGN PATENT DOCUMENTS

| | | |
|---|---|---|
| JP | 2000110827 A | 4/2000 |
| JP | 2000-179537 A | 6/2000 |
| JP | 2000-230540 A | 8/2000 |
| JP | 2006-177528 A | 7/2006 |
| JP | 2007-529701 A | 10/2007 |
| JP | 2009-532634 A | 9/2009 |
| JP | 2011-137489 A | 7/2011 |

OTHER PUBLICATIONS

Office Action issued in Japanese Patent Application No. 2013-163466 dated Apr. 26, 2017.

* cited by examiner

BALL JOINT AND METHOD OF MANUFACTURING THE SAME

CROSS-REFERENCE TO RELATED APPLICATIONS

This application is the National Stage of International Patent Application No. PCT/JP2014/064226, filed on May 29, 2014, which claims priority to Japanese Patent Application No. 2013-163466, filed on Aug. 6, 2013, both of which are herein incorporated by reference in their entireties.

TECHNICAL FIELD

This invention relates to a ball joint including a receiving-side member having a swaged part deformed by swaging to hold a bearing sheet having a holding surface on which a ball part is held, and a method of manufacturing the ball joint.

BACKGROUND

A ball joint conventionally used for example in a suspension device or a steering device of a vehicle such as an automobile includes: a ball stud corresponding to a ball-side member including a ball part and a stud part as a shaft part projecting from the ball part; a cylindrical ball sheet corresponding to a bearing sheet made of synthetic resin, for example, that holds the ball part of the ball stud in a manner that allows rotation of the ball part; and a housing in the shape of a cylinder with a closed bottom corresponding to a receiving-side member including a housing body corresponding to a receiving part having an inner chamber where the ball sheet holding the ball part is received.

According to a method of manufacturing the aforementioned ball joint, the ball sheet holding the ball part is press fitted into the inner chamber of the housing. Then, an end portion of the housing on an opening side thereof is deformed by swaging, thereby forming a known structure where the ball sheet and the ball part are retained and fixed together in the housing (see PTL 1 and PTL 2, for example).

SUMMARY OF INVENTION

Technical Problem

However, in the structure described in the aforementioned PTL 1, an end portion of the ball sheet is fixed directly with the end portion of the housing. In this structure, the amount of swaging of the housing (the amount of inclination of the end portion of the housing) directly acts as a preload (preliminary load) on the ball part to affect torque. Specifically, variation in the amount of swaging leads to variation in the amount of torque, causing the risk of serious effect on the performance of the ball joint.

In the structure described in the aforementioned PTL 2, a projecting part projecting like a flange is provided at an edge portion of an opening of the ball sheet and the projecting part is fixed by being clamped with the housing, thereby suppressing the aforementioned preload. In this structure, however, the projecting part is entirely clamped by a stepped part as a supporting part projecting in an axis-perpendicular direction perpendicular to an axis direction of the ball joint and a swaged part. This makes size increase of the ball joint unavoidable.

The aforementioned problem occurs not only in a ball joint for use in a vehicle but also in a ball joint used in any place.

This invention has been made in view of these circumstances. It is an object of this invention to provide a ball joint and a method of manufacturing the ball joint capable of reducing variation in torque caused by variation in the amount of swaging of a swaged part while suppressing size increase of the ball joint.

Solution to Problem

A ball joint includes: a ball-side member including a ball part; a bearing sheet including a body part, a projecting part, and an inclined surface, the body part having a holding surface that holds the ball part in a manner that allows rotation of the ball part and an opening part that is opened to the side of a specified direction of the holding surface, the projecting part projecting at an outer edge portion of the opening part of the body part in a crossing direction crossing the specified direction, the inclined surface being provided on a tip side of the projecting part and inclined relative to the crossing direction toward an outer edge portion on the body part side; and a receiving-side member including a cylindrical receiving part, a supporting part, and a swaged part. The receiving part receives the bearing sheet having the holding surface on which the ball part is held. The supporting part is provided to one end of the receiving part in the specified direction and inclined relative to the crossing direction toward an inner edge portion on an opposite end side of the receiving part in the specified direction. The swaged part protrudes from the supporting part so as to be inclined relative to the crossing direction on the one end side in the specified direction to clamp the projecting part between the swaged part and the supporting part at a position corresponding to at least a part of the inclined surface.

In the ball joint as recited above the receiving-side member includes an anti-corotation part provided to the swaged part. The anti-corotation part abuts on the projecting part of the bearing sheet to prevent corotation of the bearing sheet.

According to an example of a ball joint, the receiving-side member includes a spatial part in which an excess thickness of the projecting part is located. The spatial part is continuous with the supporting part.

A method of manufacturing a ball joint including: a ball-side member including a ball part; a bearing sheet including a body part, a projecting part, and an inclined surface, the body part having a holding surface that holds the ball part in a manner that allows rotation of the ball part and an opening part that is opened to the side of a specified direction of the holding surface, the projecting part projecting at an outer edge portion of the opening part of the body part in a crossing direction crossing the specified direction, the inclined surface being provided on a tip side of the projecting part and inclined relative to the crossing direction toward an outer edge portion on the body part side; and a receiving-side member including a cylindrical receiving part, a supporting part, and a swaged part. The receiving part receives the bearing sheet having the holding surface on which the ball part is held. The supporting part is provided to one end of the receiving part in the specified direction and inclined relative to the crossing direction toward an inner edge portion on an opposite end side of the receiving part in the specified direction. The swaged part protrudes from the supporting part. The method includes: forming the bearing sheet in a manner such that the inclined surface is inclined relative to the crossing direction at a specified sheet inclination angle; receiving the bearing sheet holding the ball part with the receiving part and supporting the projecting part with the supporting part; and deforming the swaged part by swaging so as to incline the swaged part relative to the crossing direction on the one end side in the specified direction along a specified swaged part inclination angle larger than the sheet inclination angle, thereby clamping the projecting part between the swaged part and the supporting part at a position corresponding to at least a part of the inclined surface.

According to the ball joint, the projecting part can efficiently be clamped by the supporting part and the swaged part both inclined relative to the crossing direction crossing the axis direction only at a position on the tip side of the projecting part corresponding to at least a part of the inclined surface inclined relative to the crossing direction. Thus, the projecting part is not entirely clamped, so that the supporting part and the swaged part are not made to jut out excessively in the crossing direction. This can suppress size increase of the ball joint reliably. Further, the projecting part is clamped only at the position on the tip side of the projecting part selectively and intensively by the supporting part and the swaged part. Thus, a preload to be caused by variation in the amount of swaging in forming the swaged part is unlikely to be transmitted to the body part side. As a result, a preload to be applied to the ball part held by the holding surface can be suppressed significantly. This can reduce variation in the preload caused by the variation in the amount of swaging, thereby suppressing variation in torque.

According to another example of the ball joint, the swaged part is provided with the anti-corotation part that abuts on the projecting part of the bearing sheet to prevent corotation of the bearing sheet. Thus, in addition to achieving the effect of the ball joint as recited above, this ball joint can prevent corotation of the bearing sheet more reliably.

A further example of the ball joint is where the spatial part is provided continuously with the supporting part as a part in which the excess thickness of the projecting part is located that is deformed by the swaging deformation of the swaged part. Thus, in addition to achieving the effect of the ball joint as recited above, this ball joint can reliably prevent an unnecessary preload to be caused if the excess thickness resulting from the deformation of the projecting part caused by the swaging deformation of the swaged part flows inwardly of the body part. As a result, variation in torque can be reduced more reliably.

According to the method of manufacturing the ball joint, the bearing sheet is formed in a manner such that the inclined surface is inclined relative to the crossing direction at the specified sheet inclination angle while the swaged part is deformed by swaging so as to incline the swaged part relative to the crossing direction along the specified swaged part inclination angle larger than the sheet inclination angle. Thus, the projecting part can efficiently be clamped between the swaged part and the supporting part inclined relative to the crossing direction crossing the axis direction only at a position on the tip side of the projecting part corresponding to at least a part of the inclined surface relative to the crossing direction. Thus, the projecting part is not entirely clamped, so that the supporting part and the swaged part are not made to jut out excessively in the crossing direction. This can suppress size increase of the ball joint reliably. Further, the projecting part is clamped only at the position on the tip side of the projecting part selectively and intensively by the supporting part and the swaged part. Thus, a preload caused by variation in the amount of swaging of the swaged part is unlikely to be transmitted to the body part side. As a result, a preload to be applied to the ball part held by the holding surface can be suppressed significantly. This can reduce variation in the preload caused by the variation in the amount of swaging, thereby suppressing variation in torque.

DESCRIPTION OF EMBODIMENTS

An embodiment of this invention is described below in terms of its construction by referring to FIGS. 1 to 3 A and 3B.

Figure 2:
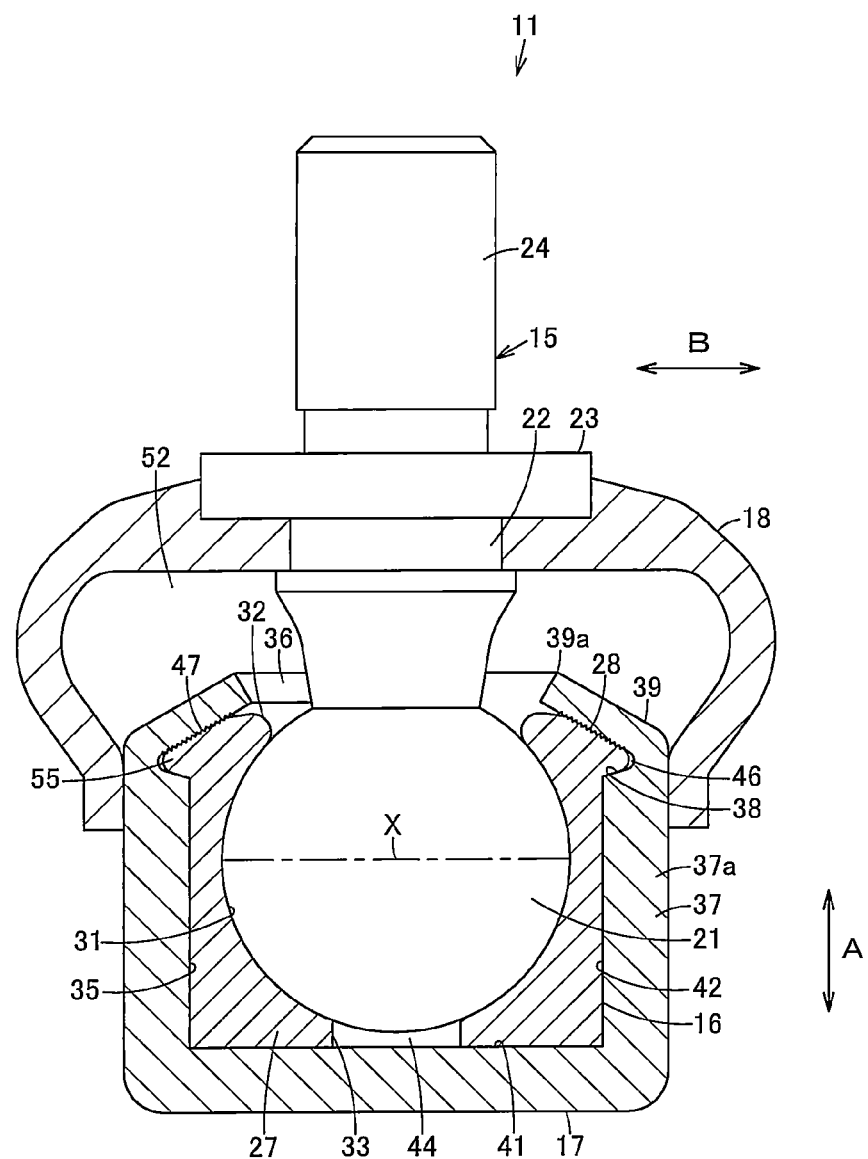
FIG. 2 is a sectional view of the same ball joint.

Referring to FIG. 2, reference number 11 denotes a ball joint. The ball joint 11 is used for example in a suspension device or a steering device of a vehicle such as an automobile. The ball joint 11 includes: a ball stud 15 corresponding to a ball-side member; a ball sheet 16 corresponding to a bearing sheet that holds a part of the ball stud 15; a housing 17 corresponding to a receiving-side member that holds the part of the ball stud 15 and the ball sheet 16 together; and a dust cover 18 corresponding to an anti-dust member arranged between the ball stud 15 and the housing 17. A vertical direction mentioned below means a vertical direction of FIG. 2.

The ball stud 15 has a ball part 21 as a substantially spherical ball head part, and a stud part 22 that is a shaft part like a round shaft projecting from the ball part 21 and extending lengthwise in the vertical direction. A flange part 23 is formed integrally with the stud part 22 on the outer peripheral side of the stud part 22 so as to project outwardly from an intermediate position of the stud part 22 in its lengthwise direction. The ball part 21, the stud part 22, and the flange part 23 are each made of metal, for example. The stud part 22 has an outer peripheral surface with a screw groove 24 as a connection part formed on an upper end side of the stud part 22. A nut not shown in the drawings is threadedly engaged with the screw groove 24 to fixedly clamp a target of fixation (not shown in the drawings) between the flange part 23 and the nut, thereby connecting the ball joint 11 to the target of fixation.

For example, the ball sheet 16 is entirely made of synthetic resin integrally. The ball sheet 16 includes a sheet body 27 corresponding to a cylindrical body part, a projecting part 28 projecting like a flange from the sheet body 27, and an inclined surface 29 provided to the projecting part 28. The synthetic resin used for forming the ball sheet 16 is polyether ether ketone (PEEK) or fiber reinforced polyimide (PI) or the like, for example.

The sheet body 27 includes a sliding contact surface 31 corresponding to a holding surface in the shape of a spherical surface that holds the outer circumferential surface of the ball part 21 including an equator X thereof in a manner that allows rotation of the ball part 21. The sheet body 27 further includes an opening part 32 and an opening part 33 (first and second opening parts) communicating with the sliding contact surface 31. The opening parts 32 and 33 are located at an upper end and a lower end that are opposite ends of the ball sheet 16 (sheet body 27) in an axis direction A (an axis direction of the ball joint 11) corresponding to a specified direction. In the sheet body 27, the opening parts 32 and 33 each have an opening area smaller than the diameter dimension of the ball part 21 to prevent the ball part 21 from coming off the ball sheet 16. The equator X of the ball part 21 means a position where the diameter dimension of the ball part 21 is at a maximum in an axis direction of the ball stud 15.

The projecting part 28 is located at the upper end corresponding to one end of the sheet body 27 in the axis direction. The projecting part 28 projects in a continuous annular shape along the entire periphery of the sheet body 27 so as to extend outwardly from an outer edge portion of the opening part 32, specifically, along an axis-perpendicular direction B corresponding to a crossing direction crossing (perpendicular to) the axis direction A. The projecting part 28 has an outer peripheral part 28a as a tip part thereof that projects further in the axis-perpendicular direction B than the outer peripheral surface of the sheet body 27.

The inclined surface 29 is formed on an upper surface of the projecting part 28 that is a main surface thereof on aside opposite to the sheet body 27. The inclined surface 29 is formed on at least an outer edge side of the projecting part 28 so as to be continuous with the outer peripheral part 28a of the projecting part 28. At a stage before the ball sheet 16 is fixed to the housing 17, the inclined surface 29 is formed by being inclined relative to the axis-perpendicular direction B at a first inclination angle α corresponding to a sheet inclination angle that is a specified acute angle of 45° or less toward an external side that is opposite to the central axis of the ball joint 11 to extend toward the sheet body 27 side, specifically, downwardly.

The housing 17 is also called a socket and is integrally formed of metal such as aluminum, for example. The housing 17 includes: a housing body 37 corresponding to a receiving part in the shape of a cylinder with a closed bottom including an inner chamber 35 where the ball part 21 is held through intervention of the ball sheet 16 and an opening 36 communicating with the upper end corresponding to one end of the inner chamber 35 in the axis direction A; a supporting part 38 located at an upper end of the housing body 37; and a swaged part 39 extending upwardly from the supporting part 38 of the housing body 37.

The inner chamber 35 is a part to which the ball sheet 16 holding the ball part 21 is fitted, specifically, a part where the ball part 21 is received. The inner chamber 35 includes a circular bottom surface part 41 extending like a flat surface along the axis-perpendicular direction B and a cylindrical peripheral surface part 42 standing from the peripheral edge of the bottom surface part 41.

The bottom surface part 41 tightly contacts a lower end corresponding to an opposite end of the ball sheet 16 in the axis direction A fitted in the inner chamber 35. The bottom surface part 41 and the opening part 33 of the ball sheet 16 define a grease storage space 44 therebetween that is a lubricant housing part to house grease as a lubricant that is not shown in the drawings.

The peripheral surface part 42 tightly contacts the outer peripheral surface of the sheet body 27 of the ball sheet 16 fitted in the inner chamber 35 with no space therebetween.

The opening 36 is opened at the upper end of the inner chamber 35. The opening 36 has a circular shape with an outer edge defined by the peripheral surface part 42.

The supporting part 38 is also called a socket stepped part that supports a lower portion of the projecting part 28 of the ball sheet 16. The supporting part 38 is formed by being inclined relative to the axis-perpendicular direction B at a second inclination angle β corresponding to a supporting part inclination angle that is a specified acute angle of 45° or less toward an internal side of the central axis of the ball joint 11 to extend downwardly toward an opposite end side in the axis direction A.

The swaged part 39 is deformed by swaging to hold the ball sheet 16 and the ball part 21 (ball stud 15) together. In a state before the swaged part 39 is deformed by swaging, specifically, before the swaged part 39 holds the ball sheet 16, the swaged part 39 has a cylindrical shape projecting from the outer edge portion of the supporting part 38 along the axis direction A so as to be flush with the outer peripheral surface of the housing body 37. The swaged part 39 is formed thinner than an outer peripheral part 37a of the housing body 37. Specifically, the swaged part 39 is continuous in a stepwise manner with the housing body 37 at a position of the opening 36. Thus, a spatial part 46 is formed consecutive to the supporting part 38 between the lower end of the swaged part 39 deformed by swaging and the supporting part 38 so as to extend like a V-shape along the axis-perpendicular direction B. The swaged part 39 has an inner peripheral surface provided with an anti-corotation part 47 that prevents corotation of the ball sheet 16 relative to the housing 17. Here, the anti-corotation part 47 has a pattern with projections and depressions formed by providing groove parts (serrations) in a lattice pattern in the inner peripheral surface of the swaged part 39 or providing multiple specified protrusions or the like, for example. The anti-corotation part 47 cuts into the projecting part 28 to increase a contact area with the projecting part 28.

The swaged part 39 is deformed by swaging toward the central axis of the ball joint 11 (housing 17) by using a specified jig not shown in the drawings, for example, thereby inclining an upper end part 39a as a tip portion toward this central axis. In this way, the swaged part 39 is inclined relative to the axis-perpendicular direction B at a third inclination angle γ corresponding to a swaged part inclination angle that is a specified acute angle of 45° or less larger than the first inclination angle α. As a result of this inclination, the swaged part 39 is deformed and clamps an outer peripheral side of the projecting part 28 of the ball sheet 16 between the swaged part 39 and the supporting part 38 at a position on the inclined surface 29. Specifically, the swaged part 39 is deformed by swaging to deform the projecting part 28 of the ball sheet 16 along the inner surface of the swaged part 39 at the position on the inclined surface 29. In this state, the anti-corotation part 47 abuts on (cuts into) the outer surface of the projecting part 28 of the ball sheet 16.

The dust cover 18 is also called a dust seal or a boot. For example, the dust cover 18 is entirely formed of soft rubber or soft synthetic resin. The dust cover 18 is fitted to the ball stud 15 at an upper end extending over the lower end and the outer periphery of the flange part 23 and is fitted at a lower end to the outer periphery of the housing body 37 of the housing 17 on the upper end side of the housing body 37. Further, the dust cover 18 has a lower end portion fixed with a clip not shown in the drawings that is an annular member in the shape of a substantially circular ring. Space surrounded by the dust cover 18, the ball stud 15, and the ball sheet 16 is grease storage space 52 that is a lubricant housing part to house grease as a lubricant not shown in the drawings.

A method of manufacturing the ball joint 11 of the aforementioned embodiment is described next.

Figure 3A:
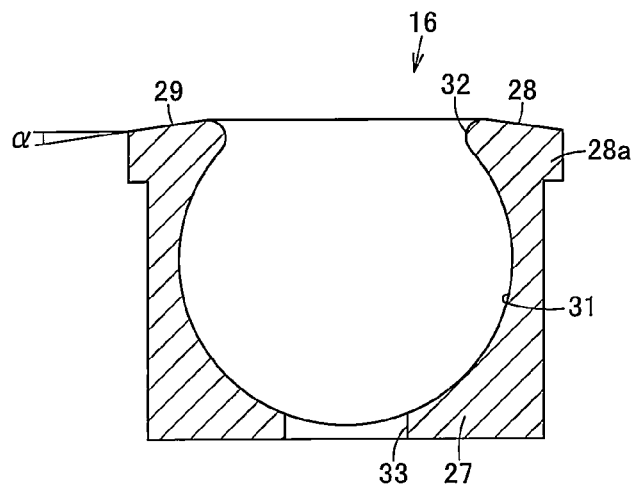
FIG. 3A is a sectional view showing a bearing sheet in a state before the same ball joint is assembled and FIG. 3B is a sectional view showing a receiving-side member in a state before the same ball joint is assembled.
Figure 3B:
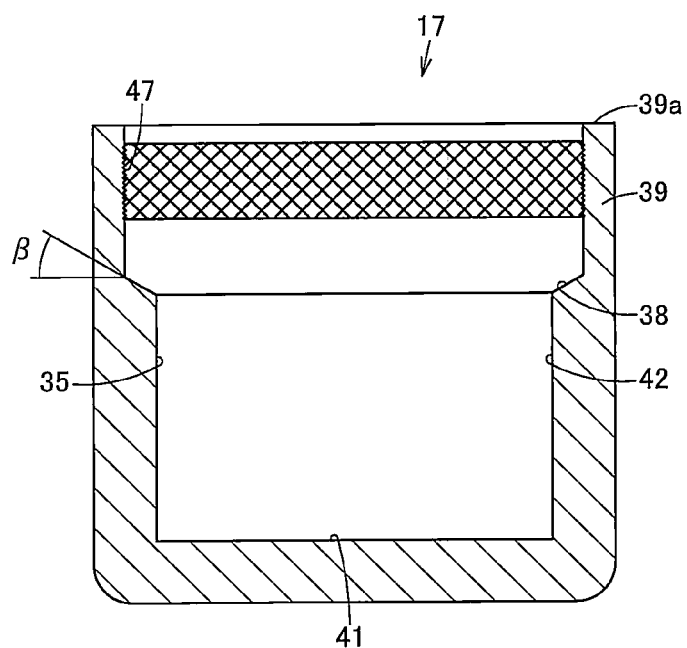

First, the ball sheet 16 and the housing 17 are each formed (FIGS. 3A and 3B). In this state, the inclined surface 29 of the ball sheet 16 is inclined relative to the axis-perpendicular direction B at the first inclination angle α and the swaged part 39 of the housing 17 extends along the axis direction A to be substantially vertical to the axis-perpendicular direction B.

Then, the ball part 21 formed separately is press fitted into the ball sheet 16 through the opening part 32 (or opening part 33) of the ball sheet 16 while the ball sheet 16 is elastically deformed to hold the outer circumferential surface of the ball part 21 with the sliding contact surface 31. Instead of forming the ball sheet 16 separately from the ball part 21 and press fitting the ball part 21 into the ball sheet 16, the ball sheet 16 may alternatively be configured in a manner such that the ball part 21 is formed as a core and the ball sheet 16 is formed on the outer circumferential surface of the ball part 21 by injection molding, for example.

Next, the ball sheet 16 holding the ball part 21 is press fitted into the inner chamber 35 of the housing body 37 of the housing 17 through the opening 36. In this state, the ball sheet 16 is supported in the axis direction A with the lower end (a corner portion at the lower end) of the outer peripheral part 28a of the projecting part 28 linearly abutting on the supporting part 38 inclined downwardly at the second inclination angle β toward the central axis side.

Figure 1:
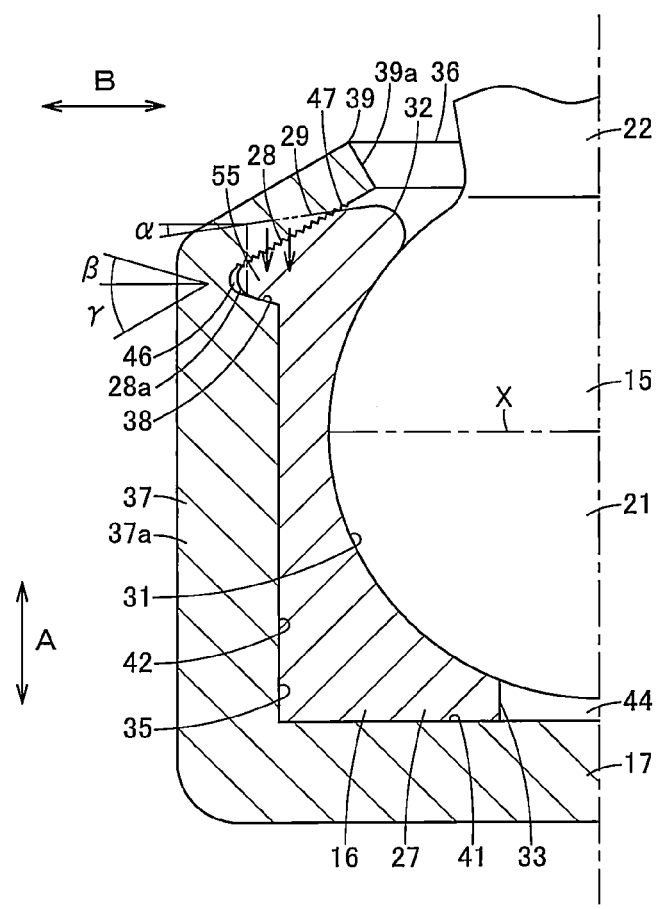
FIG. 1 is a sectional view showing a part of a method of manufacturing a ball joint according to an embodiment of this invention.

Then, the swaged part 39 is deformed by swaging toward the central axis to be inclined relative to the axis-perpendicular direction B to achieve the third inclination angle γ (FIG. 1). At this time, as a result of a difference between the inclination angles α and γ, the projecting part 28 of the ball sheet 16 is clamped in the axis direction A at a position on the outer edge side of the inclined surface 29 by the swaged part 39 and the supporting part 38 to be deformed plastically along the inner peripheral surface of the swaged part 39. An excess thickness 55 of the projecting part 28 resulting from the deformation escapes outwardly to the spatial part 46 and the anti-corotation part 47 cuts into an upper surface of the projecting part 28 on an opposite side of the supporting part 38, thereby preventing rotation of the ball sheet 16 and retaining the ball sheet 16. In this state, the swaged part 39 extends along the upper end of the projecting part 28 and the upper end part 39a extends to a position outside the opening part 32 at the upper end of the ball sheet 16. Regarding the ball sheet 16, the outer peripheral part 28a of the projecting part 28 is separated from the housing 17 (swaged part 39) and the projecting part 28 is clamped from above and below by the supporting part 38 and the swaged part 39 at a position outside the sheet body 27 (the inner chamber 35 of the housing 17).

As described above, in the aforementioned embodiment, the ball sheet 16 is formed in a manner such that the inclined surface 29 is inclined relative to the axis-perpendicular direction B at the first inclination angle α. The ball sheet 16 holding the ball part 21 is received by the housing body 37. The projecting part 28 projecting in the axis-perpendicular direction B at the outer edge portion of the opening part 32 of the sheet body 27 of the ball sheet 16 is supported by the supporting part 38 inclined relative to the axis-perpendicular direction B. The swaged part is deformed by swaging to be inclined relative to the axis-perpendicular direction B along the specified third inclination angle γ larger than the first inclination angle α. As a result, the projecting part 28 is clamped between the supporting part 38 and the swaged part 39 at a position corresponding to at least a part of the inclined surface 29 that is inclined at a tip side of the projecting part 28 relative to the axis-perpendicular direction B along the specified first inclination angle α toward an outer edge portion on the sheet body 27 side. In this way, the projecting part 28 can be efficiently clamped only at a position on the tip side of the projecting part 28 by the supporting part 38 and the swaged part 39 that are both inclined toward the central axis of the ball joint 11 (inwardly) relative to the axis-perpendicular direction B at the second and third inclination angles β and γ respectively to diverge into a V-shape. Specifically, the projecting part 28 is not entirely clamped by the supporting part 38 and the swaged part 39. Further, the supporting part 38 and the swaged part 39 are both inclined relative to the axis-perpendicular direction B. Compared to a configuration where a supporting part is formed along the axis-perpendicular direction B and a projecting part is entirely clamped by a swaged part and the supporting part in the axis direction A (vertical direction), for example, the supporting part 38 and the swaged part 39 are not made to jut out excessively in the axis-perpendicular direction B to avoid size increase thereof. This can suppress size increase of the ball joint 11 reliably.

The projecting part 28 can be clamped only at the position on the tip side of the projecting part 28 selectively and intensively by the supporting part 38 and the swaged part 39. Thus, even in the case of occurrence of variation in the amount of swaging of the swaged part 39, a preload (preliminary load) caused by the variation is not transmitted (is unlikely to be transmitted) to the sheet body 27 side. As a result, a preload to be applied to the ball part 21 held by the sliding contact surface 31 of the sheet body 27 can be suppressed significantly. This can reduce variation in the preload caused by the variation in the amount of swaging, thereby suppressing variation in torque (the amount of torque can be stabilized).

The swaged part 39 is provided with the anti-corotation part 47 that abuts on the projecting part 28 of the ball sheet 16 to prevent rotation of the ball sheet 16. Thus, the corotation of the ball sheet 16 can be prevented more reliably.

Further, the spatial part 46 is provided continuously with the supporting part 38 as a part into which the excess thickness 55 of the projecting part 28, deformed by the swaging deformation of the swaged part 39, escapes. This can reliably prevent an unnecessary preload to be caused if an excess thickness resulting from the deformation of the projecting part 28 caused by the swaging deformation of the swaged part 39 flows inwardly of the sheet body 27. As a result, variation in torque can be reduced more reliably.

In the aforementioned embodiment, the ball joint 11 is applicable not only as a ball joint for use in a suspension device or a steering device but also as any ball joint for use in a vehicle or any ball joint for use in a place other than a vehicle.

This invention can be suitably used in a suspension device or a steering device of a vehicle such as an automobile, for example.

The invention claimed is:

1. A ball joint comprising:
 a ball-side member including a ball part;
 a bearing sheet including a body part, a projecting part, and an inclined surface, the body part having a holding surface that holds the ball part in a manner that allows rotation of the ball part and an opening part that is opened to the side of a specified direction of the holding surface, the projecting part projecting at an outer edge portion of the opening part of the body part in a crossing direction crossing the specified direction, the inclined surface being provided on a tip side of the projecting part and inclined relative to the crossing direction toward an outer edge portion on the body part side; and a receiving-side member comprising a cylindrical receiving part, a supporting part, a swaged part, and a spatial part, wherein:

the receiving part receiving the bearing sheet having the holding surface on which the ball part is held, the supporting part being provided to one end of the receiving part in the specified direction and inclined relative to the crossing direction toward an inner edge portion on an opposite end side of the receiving part in the specified direction, the swaged part, deformed by swaging from the supporting part so as to be inclined relative to the crossing direction on the one end side in the specified direction to clamp the projecting part in a deformed state between the swaged part and the supporting part at a position corresponding to at least a part of the inclined surface, and the spatial part being continuous with the supporting part and located for an excess thickness of the projecting part deformed by the swaging deformation of the swaged part to escape.

2. The ball joint according to claim 1, wherein the receiving-side member includes an anti-corotation part provided to the swaged part, the anti-corotation part abutting on the projecting part of the bearing sheet to prevent rotation of the bearing sheet.

3. A method of manufacturing a ball joint according to claim 1, comprising:

forming the bearing sheet in a manner such that the inclined surface is inclined relative to the crossing direction at a specified sheet inclination angle;

receiving the bearing sheet holding the ball part with the receiving part and supporting the projecting part with the supporting part; and deforming the swaged part by swaging so as to incline the swaged part relative to the crossing direction on the one end side in the specified direction along a specified swaged part inclination angle larger than the sheet inclination angle, thereby clamping the projecting part in a deformed state between the swaged part and the supporting part at a position corresponding to at least a part of the inclined surface and flowing and escaping an excess thickness of the deformed projecting part to the spatial part.

4. A method of manufacturing a ball joint according to claim 2, comprising:

forming the bearing sheet in a manner such that the inclined surface is inclined relative to the crossing direction at a specified sheet inclination angle;

receiving the bearing sheet holding the ball part with the receiving part and supporting the projecting part with the supporting part; and deforming the swaged part by swaging so as to incline the swaged part relative to the crossing direction on the one end side in the specified direction along a specified swaged part inclination angle larger than the sheet inclination angle, thereby clamping the projecting part in a deformed state between the swaged part and the supporting part at a position corresponding to at least a part of the inclined surface and flowing and escaping an excess thickness of the deformed projecting part to the spatial part.

* * * * *